(12) United States Patent  
Nelson et al.

(10) Patent No.: US 6,626,447 B2  
(45) Date of Patent: Sep. 30, 2003

(54) PIPELINE PATCH TROLLEY

(75) Inventors: Joseph P Nelson, Bozeman, MT (US); Jeffrey T Sitz, Bozeman, MT (US); Scott W Brady, Bozeman, MT (US); Rick P. Meyer, Bozeman, MT (US); Kirt J. Rierson, Bozeman, MT (US)

(73) Assignee: Barnard Construction Co., Inc., Bozeman, MT (US)

( * ) Notice: Subject to any disclaimer, the term of this patent is extended or adjusted under 35 U.S.C. 154(b) by 42 days.

(21) Appl. No.: 09/774,201

(22) Filed: Jan. 29, 2001

(65) Prior Publication Data

US 2001/0033065 A1 Oct. 25, 2001

Related U.S. Application Data

(60) Provisional application No. 60/178,649, filed on Jan. 28, 2000.

(51) Int. Cl.[7] ............................................. F16L 55/1645
(52) U.S. Cl. ......................................... 280/79.11; 138/98
(58) Field of Search ........................ 280/47.131, 47.16, 280/47.34, 79.3, 79.6, 79.11, 62, 63, 38, 39, 40

(56) References Cited

U.S. PATENT DOCUMENTS

| 3,718,978 A | * | 3/1973 | Van Koevering et al. | ..... 33/544 |
| 3,731,410 A | * | 5/1973 | Cripe | ..................... 37/104 |
| 4,601,312 A | * | 7/1986 | Parkyn, Sr. | ............... 138/97 |
| 5,049,003 A | * | 9/1991 | Barton | ................ 405/184.1 |
| 5,220,869 A | * | 6/1993 | Pelrine et al. | ............ 105/78 |
| 5,322,653 A | * | 6/1994 | Muller | .................... 264/35 |
| 5,330,227 A | * | 7/1994 | Anderson | ............... 280/759 |
| 5,451,284 A | * | 9/1995 | Ikeda et al. | ............. 156/247 |
| 5,736,166 A | * | 4/1998 | Polivka | ................... 425/11 |
| 5,878,783 A | * | 3/1999 | Smart | ..................... 138/93 |
| 6,027,286 A | * | 2/2000 | Pollack | ................ 405/195.1 |

FOREIGN PATENT DOCUMENTS

| JP | 357066002 A | * | 4/1982 |
| JP | 177112 A2 | * | 4/1986 |

* cited by examiner

Primary Examiner—Paul N. Dickson  
Assistant Examiner—Laura B. Rosenberg  
(74) Attorney, Agent, or Firm—Todd N. Hathaway

(57) ABSTRACT

A vehicle for transporting and installing an annular patch in a pipeline having a curved inside surface. There is a tubular support member and an annular bladder mounted on the support member for forcing the patch against the inside of the pipeline when inflated. Pivoting wheel assemblies are mounted to the ends of the tubular support member so that the wheels extend normal to the curved inside surface of the pipeline. A ballast member is mounted between the wheel assemblies to maintain the vehicle in an upright orientation. Compressed air for inflating the bladder is supplied by hose to a fitting within the hollow interior of the tubular support. The wheel assemblies may be removable or inwardly pivotable so as to provide clearance for the patch to be slipped over the support and bladder.

24 Claims, 4 Drawing Sheets

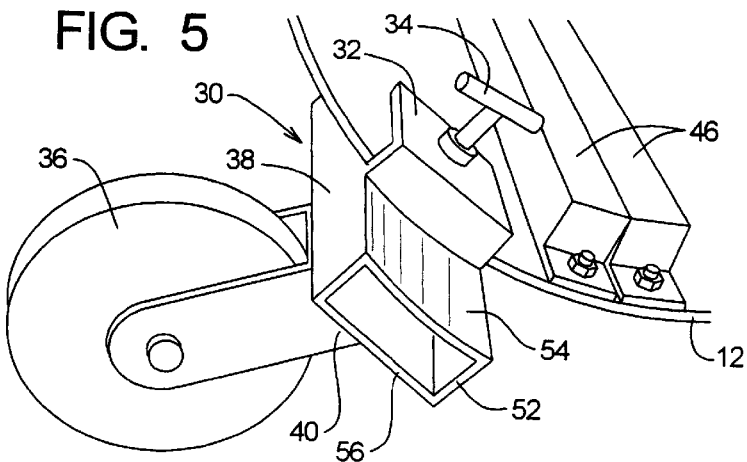
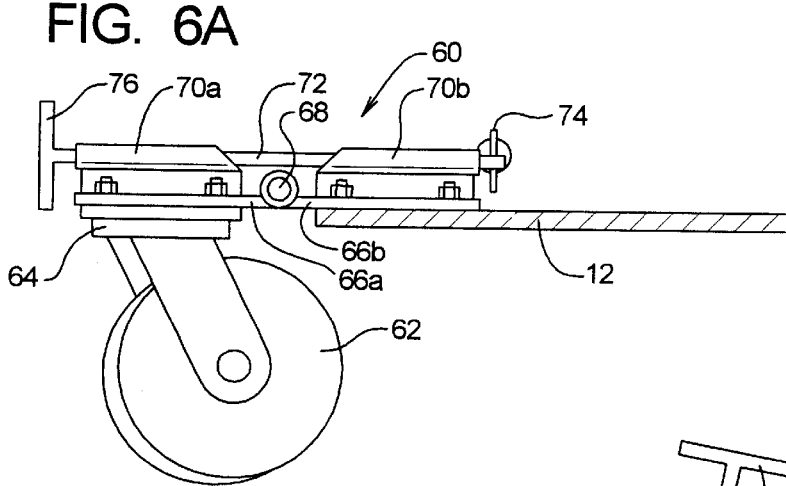
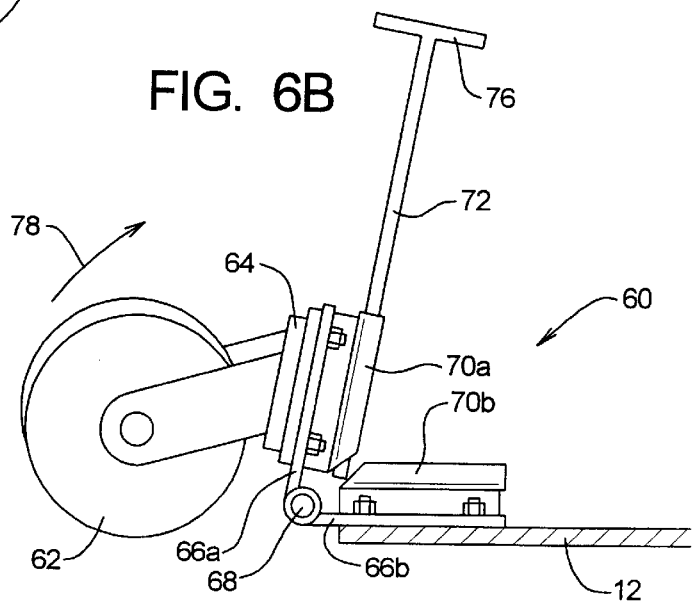

PIPELINE PATCH TROLLEY

This application claims benefit of provisional application Ser. No. 60/178,649 filed Jan. 28, 2000

BACKGROUND OF THE INVENTION a. Background of the Invention

The present invention relates generally to methods and apparatus for repairing pipelines and similar conduits, and, more particularly to a vehicle for delivering expandable patch for internal repair of a pipeline or other conduit.

b. Related Art

Pipelines and similar conduits often require repair, due to erosion, fracturing, corrosion and similar damage. Examples of such conduits include water lines, gas lines, and sewer lines, and these and all similar conduits are included in the terms "pipe", "pipeline" and "conduit" as used herein. Typically (although not always) the pipelines in which the apparatus of the present invention will be used will have a comparatively large diameter (e.g., on the order of 24–60 inches, or larger).

It is usually preferable, especially from an economic standpoint, to repair a damaged pipeline from inside, if this is at all possible. One approach which has been developed for this purpose, and which has been used with considerable success, employs an annular, expandable patch which is forced against the inside of the pipeline so as to form an internal sleeve which covers the damaged area. The internal patch typically is formed of a resin material which is soft and yieldable when it is first expanded against the inside of a pipe, and then subsequently hardens to a tough, rigid condition. One example of an internally expanded patch is the fiber-resin patch that is shown in U.S. Pat. No. 5,322,653 to Mueller.

Although patches of this type have proven successful in and of themselves, a perennial problem has existed as to how to transport the patch through the inside of the pipeline and into position in an efficient and reliable manner. Varieties of transport devices have been used in the prior art and have generally proven less than satisfactory. At one end of the spectrum, there has been the approach of simply "dragging" the patch through the pipeline on some form of plug or body, but this is not a reliable method and can result in excessive damage to the patch; in some instances, an umbrella-shaped shield has been installed in an effort to protect the patch from abrasion as it is being pulled through the pipeline, but again, this has been less than satisfactory, especially in the case of comparably large diameter pipelines where the weight of the assembly, and therefore the friction which it generates, is greatly increased.

A number of wheeled vehicles have also been employed or proposed for carrying the patch into place, but these have generally exhibited drawbacks of their own. The most common form, of vehicle resembles a wheeled "saw horse" which supports a cylindrical sleeve and bladder for expanding the annular patch against the inside of a pipe. Although this type of vehicle has the advantage of being simple, it has the maddening tendency to tip over while being pulled through the pipeline, so that the entire assembly must be withdrawn and reassembled for another try. In other instances, wheels have been temporarily mounted directly to the cylindrical support structure, but in many instances this has led to an excessively complex, expensive and cumbersome transport vehicle. Moreover, due to irregularities in the walls of the pipelines (which are often formed of concrete and which may be eroded or worn), and also due to the practical difficulties of trying to maintain the wheels in precise alignment when working in a harsh field environment, prior wheeled transport devices have had a strong tendency to twist or "walk" up the cylindrical walls of the pipeline and also tend to work against each other and bind up; this makes transporting of the patch very difficult and sometimes causes the tow cable and compressed air lines (the latter being used to inflate the bladder) to become twisted.

Accordingly, there exists a need for a transport vehicle for delivering and positioning an expandable, internal pipeline patch that is efficient and reliable in use. Furthermore, there exists a need for such a transport vehicle having an economical and durable form of construction. Still further, there exists a need for such a vehicle that can be pulled through pipelines and other cylindrical conduits with little resistance and without twisting or binding inside the pipeline. Still further, there exists a need for such a vehicle that allows the annular patch to be quickly and easily installed over the cylindrical support and bladder on which the patch is carried and subsequently expanded.

SUMMARY OF THE INVENTION

The present invention has solved the problems cited above, and is a tubular transport vehicle having of pivoting wheel assemblies for maintaining the assembly and the annular patch in an upright position as this is transported longitudinally through a cylindrical pipeline.

Broadly, the transport vehicle comprises a cylindrical support structure having a plurality of pivoting wheel assemblies mounted to its forward and rearward ends so as to extend normal to the curved inner surface of the pipeline.

The pivoting wheels may comprise roller wheels that are mounted on caster pivots so as to extend radially from the cylindrical support structure. A ballast member may be mounted to the bottom portion of the cylindrical support member for cooperating with the pivoting wheel assemblies to keep the vehicle upright as it moves longitudinally through the pipeline. The ballast member may comprise at least one weight member that is mounted to an inner surface of the cylindrical support structure.

The vehicle may further comprise an annular bladder for forcing the annular patch against an inside surface of the pipeline in response to inflation of the bladder. The wheel assemblies may be detachably mounted to the cylindrical support structure, so that the wheel assemblies can be detached so as to allow the annular patch to be slipped over the inflatable bladder without having to clear the roller wheels and caster pivots of the wheel assemblies. Alternatively, the wheel assemblies may be inwardly pivotable to provide clearance for the patch to be slipped over the support and bladder.

In a preferred embodiment, the cylindrical support structure is a hollow tubular support, and the pivotable wheel assemblies are mounted thereto at angularly spaced positions with the ballast member being mounted to a bottom portion of the cylindrical support at a position generally between the pivoting wheel assembles.

The detachable wheel assemblies may be provided with clamp portions for selectively mounting the assemblies to the forward and rearward lips of the cylindrical support structure. In the inwardly retractable wheel assemblies, there may be inner and outer support members that are joined by a transverse hinge portion, with the inner support member being permanently mounted to the cylindrical support structure. The support members are locked in the outwardly deployed position by a bolt member which passes through coaxial sleeves mounted on the support members; the locking bolt is configured for being selectively withdrawn from the sleeve portions so as to permit the support member carrying the wheel and caster pivot to be pivoted inwardly about the hinge portion in order to provide clearance for the patch to be slipped over the cylindrical support and bladder.

A compressed air fitting may be provided for supplying air pressure for inflating the annular bladder so as to force the patch against the inside surface of the pipeline.

These and other features of the present invention will be apparent from a reading of the following detailed description with reference to the associated figures.

BRIEF DESCRIPTION OF THE DRAWINGS

FIG. 5 is an enlarged, perspective view of one of the pivotable wheels of the transport vehicle of FIGS. 1–4B, showing the configuration of the clamp structure, which allows this to be detached from the cylindrical support in a manner that is shown in FIG. 4A;

FIG. 6A is an elevational view of a pivoting wheel assembly in a vehicle in accordance with a second embodiment of the present invention, in which the wheel assembly is configured to be pivotable towards the interior of the cylindrical support so as to provide clearance for the annular patch to be slipped thereover, FIG. 6A showing the wheel assembly located in the outwardly deployed position;

FIG. 6B is an elevational view of the wheel assembly of FIG. 6A, showing this in the inwardly pivoted position for installation of the annular patch on the cylindrical support and bladder of the vehicle.

DETAILED DESCRIPTION

Figure 1:
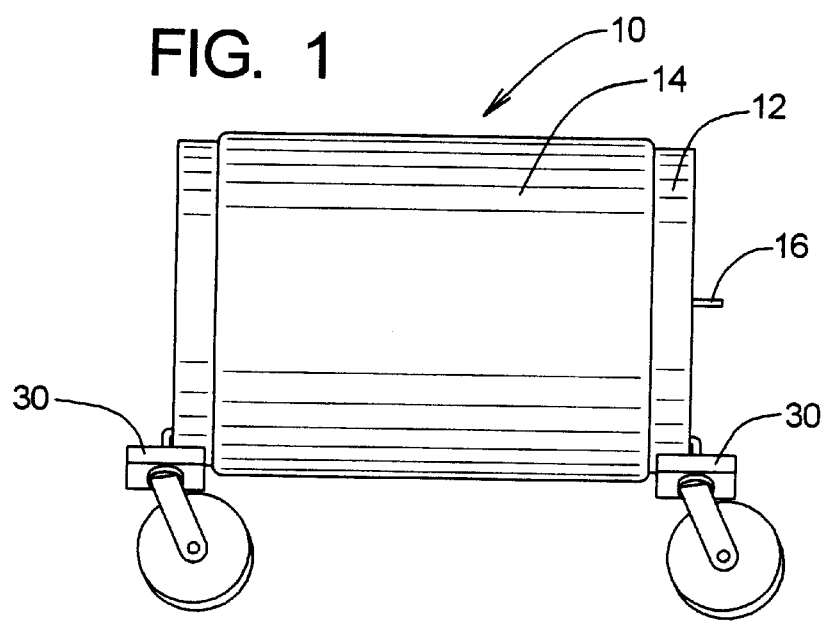
FIG. 1 is a side elevational view of a pipeline patch transport vehicle in accordance with the present invention, showing this prior to the annual pipeline patch having been installed thereon.

FIG. 1 shows a pipeline patch transport vehicle 10 in accordance with the present invention. As can be seen, this includes a tubular, substantially cylindrical support structure 12, which is suitably formed by short section of steel pipe or other suitable tubular material. The use of a support having an open, hollow interior has the advantage of allowing water or other fluid in the pipeline to pass therethrough as the vehicle is being moved into place, should this be necessary.

Figure 2:
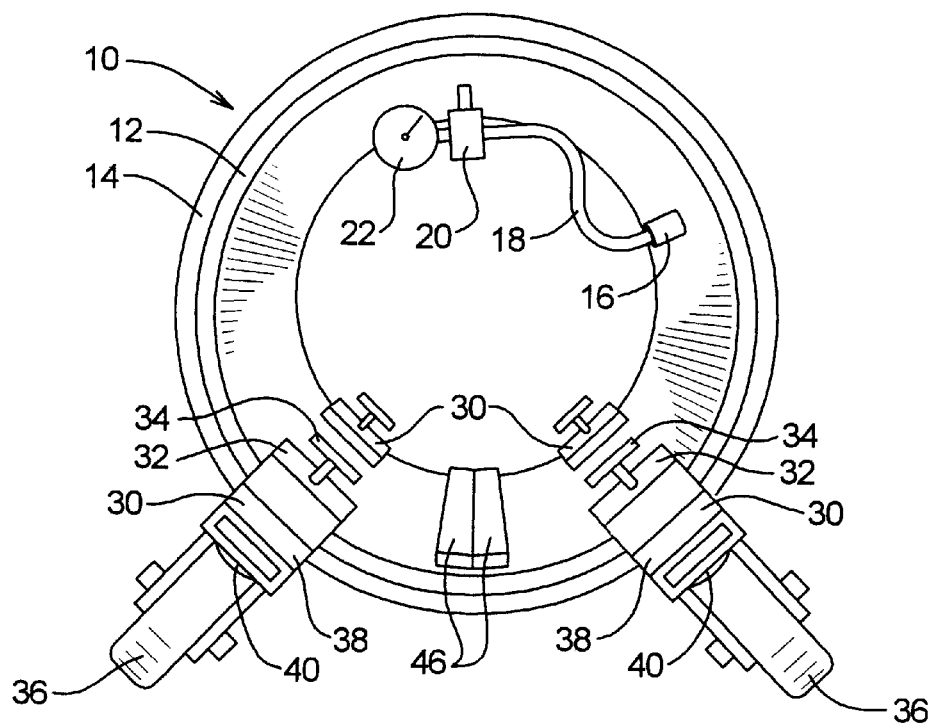
FIG. 2 is a forward end elevational view of the pipeline patch transport vehicle of FIG. 1, showing the configuration of the pivoting transport wheels and the ballast bars which cooperate with the pivoting wheels to maintain the vehicle in an upright orientation as it travels through the pipeline.

An annular, inflatable bladder 14 is mounted around the exterior of the cylindrical support structure, with compressed air being supplied to the bladder through a hose fitting 16; as can be seen in FIG. 2, pressure for inflating the bladder is supplied to the fitting 16 via a short section of air hose 18 and a valve body 20 which is suitably fitted with a pressure gauge 22.

As can be seen with further reference to FIG. 1, a plurality of pivotable wheel assemblies 30 are mounted at angularly spaced positions on the circular forward and rearward edges of the cylindrical support 12. As will be described in greater detail below, each of the wheel assemblies is configured to be quickly detachable from the cylindrical support for easy installation of the annular patch over the support and inflatable bladder. It will also be understood that, while the preferred embodiment of the invention which is illustrated in the figures is fitted with four pivoting wheel assemblies (a pair at each end), which makes for a very stable vehicle, fewer (e.g., three—a pair at one end and a single at the other) or more wheel assemblies may be used in some embodiments of the invention.

As can be seen in FIG. 2, each of the pivoting wheel assemblies 30 includes a clamp portion 32 that engages the lip of the cylindrical support. A T-handle 34 is provided for tightening and loosening the clamp portion so as to permit selective removal and reinstallation of the wheel assembly.

Each wheel assembly also includes a roller wheel 36 that is mounted to a support bracket 38 by caster pivot 40. The support bracket is welded to the clamp portion 32, and the end of the support bracket extends into engagement with the outer surface of the cylindrical support structure so as to react against this as the clamp is tightened.

Figure 3:
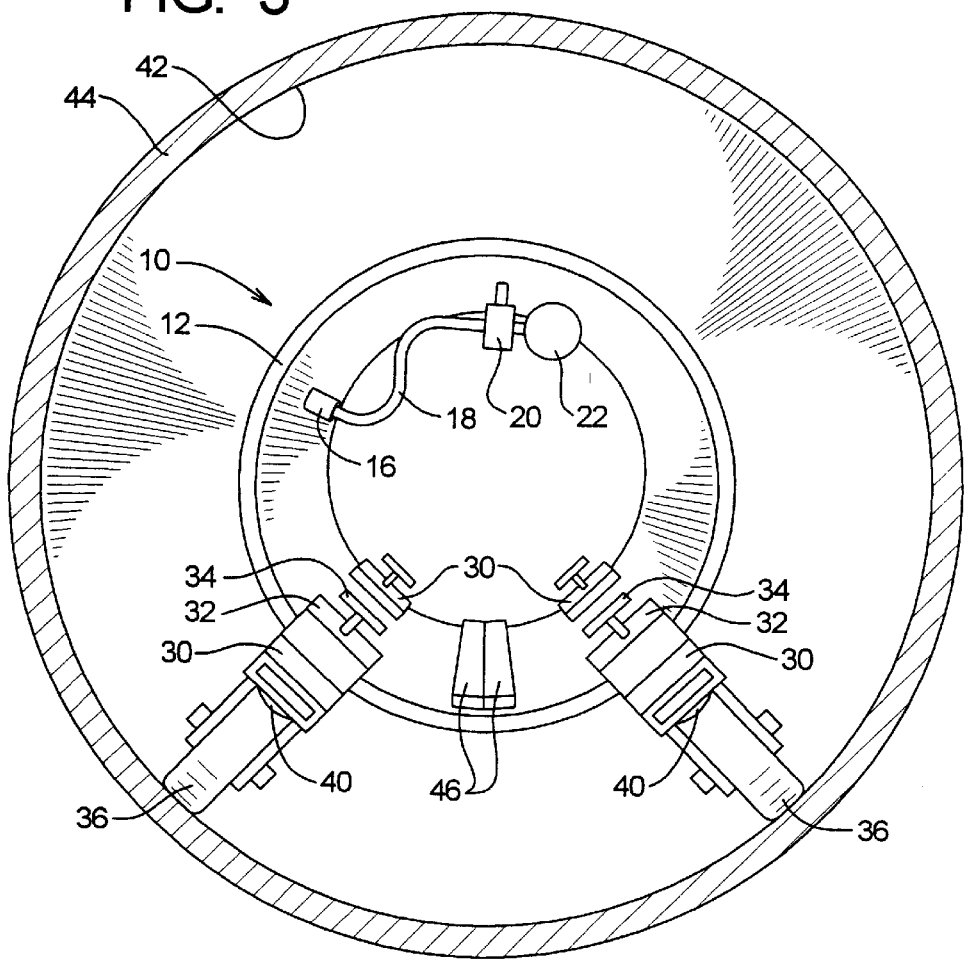
FIG. 3 is a rearward end elevational view of the transport vehicle of FIGS. 1–2, showing this installed in a pipeline and illustrating the manner in which the pivoting wheels engage with the inside surface thereof at a substantially perpendicular angle thereto.

As can be seen in FIGS. 2–3, the clamp and bracket portions of the wheel assemblies are configured so that the pivot axis of the caster pivots 40 extend in generally radial alignment from the cylindrical support tube 12, with the result that the roller wheels 36 bear more or less perpendicularly against (i.e., normal to) the cylindrical inner surface 42 of the pipeline 44. This perpendicular engagement enables the wheels 36 to pivot freely about the caster axes with little resistance; in other words, the wheels 36 pivot quite easily in response to lateral force inputs as the vehicle moves longitudinally through the pipeline.

To provide the lateral force necessary to keep the vehicle 10 upright, one or more ballast members 46 are mounted to the inside bottom of the cylindrical support structure 12. In the embodiment which is illustrated, the ballast members are provided in the form of metal (e.g., steel or lead) bars that are bolted to the support structure, but it will be understood that any suitably heavy weight that can be mounted in the inside bottom of the support structure may be used for this purpose. The ballast members thus serve to correct any tendency for the vehicle to twist or ride up the sides of the pipeline or other conduit, by providing the lateral force necessary for the wheels 36 to pivot downwardly so as to return the vehicle to its upright orientation. As a result, the transport vehicle of the present invention is able to maintain a constant vertical orientation, and moves smoothly and easily through a pipeline as it is pulled by a cable or other suitable mechanism.

Figure 4A:
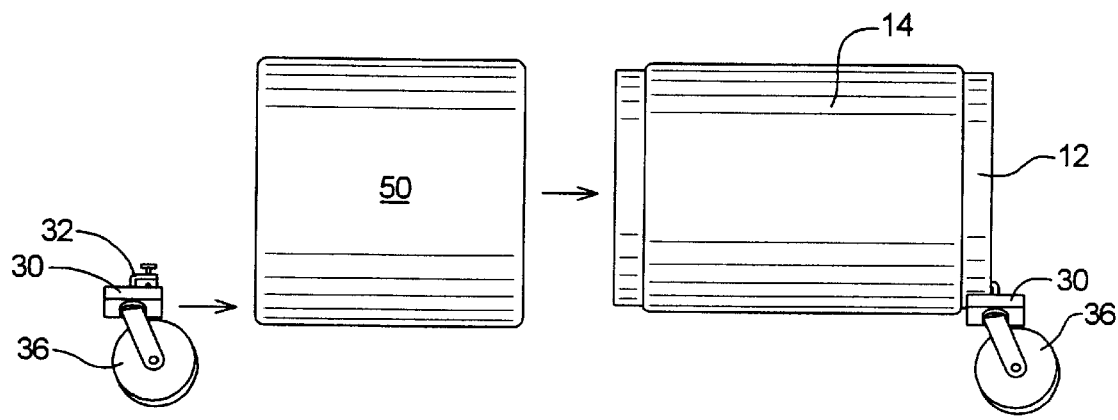
FIG. 4A is an exploded view of the transport vehicle of FIGS. 1–3, showing the wheels having been removed from one end of the vehicle so as to allow the annular patch to be slipped over the cylindrical support and inflatable bladder.

As was noted above, the wheel assemblies 30 are quickly and easily detachable from the cylindrical support member 12, by simply loosening the clamp portion 32. As can be seen in FIG. 4A, this allows the wheel assemblies to be moved from one end of the vehicle when installing the annular pipeline patch 50, so that the latter can be slipped over the relatively tight fitting bladder 14 without having to clear the roller wheels and their supports. Then, once the patch has been installed on the inflatable bladder, at a spaced distance from the lip of the cylindrical support 12, the wheel assemblies 30 are reattached by slipping the clamp portions 32 over the lip of the support structure and tightening the T-handles 34 in the manner described above.

Figure 4B:
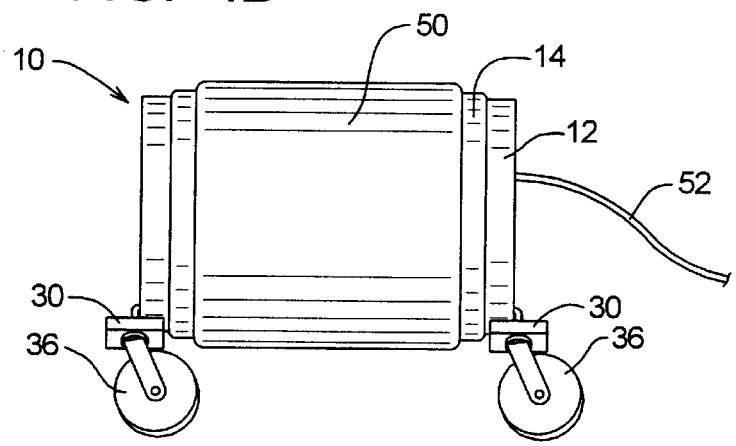
FIG. 4B is an elevational view of the transport vehicle of FIG. 4A showing this fully assembled with the annular patch installed over the cylindrical support and inflatable bladder.

The assembled vehicle 10, as is shown in FIG. 4B, is then ready to be pulled through the conduit, with the compressed air line 52 being attached to the hose fitting for inflating the bladder so as to force the patch 50 against the inside surface of the pipeline when the assembly has reached the desired position. After the patch has been forced in to place, the bladder is deflated and the pivoting wheels simply ride over the inside of the annular patch as the vehicle is withdrawn.

FIG. 5 shows the configuration of the detachable wheel assemblies 30 in greater detail. As can be seen, the support bracket 38 is suitably formed as a tubular, generally rectangular cross section member 52 having a concavely curved upper plate 54, which corresponds to the curved outer surface of the cylindrical support structure 12. The curved upper plate engages the curved outer surface of the cylindrical support structure 12 in stable engagement therewith as the clamp bolt 34 is tightened against the inner surface of the support structure. The outer plate 56, in turn, is generally planar, and is aligned to extend in a generally tangential relationship with respect to the curved inner plate 54. Thus, when the roller wheel 36 and associated caster pivot 40 are mounted to the outer plate 56, the pivot axis extends in radial alignment with respect to the cylindrical support structure 12, thereby aligning the wheel 36 in a generally normal direction with respect to the curved inside surface of the pipeline. The detachable inside wheel assemblies 30 can also be interchangeably mounted to cylindrical support structures 12 having different diameters within a given range, thereby providing an operator with a degree of flexibility and economy in assembling different sizes of transport vehicles using a single set of wheel assemblies.

FIGS. 6A–6B show a wheel assembly 60 in accordance with another embodiment of the present invention, in which the wheel assembly is permanently mounted to the lip of the cylindrical support structure 12, but is pivotable in an inward direction so as to provide clearance for installation of the annular patch member.

As can be seen in FIG. 6A, the wheel assembly 60 is provided with a roller wheel 62 and caster pivot 64 which are substantially similar to those described above. The support bracket, however, is constructed of two plate members 66a, 66b that are joined by a transverse hinge 68. The caster bearing and wheel are mounted to the outer plate 66a, and the inner plate 66b is mounted to the inside lip of the cylindrical support structure 12. First and second tubular sections 70a, 70b are welded or otherwise mounted on top of the plate members 66a, 66b, and extend in coaxial alignment when the assembly is in its outwardly pivoted, deployed position as shown in FIG. 6A. In this position, a locking bolt 72 is passed through the two sleeve portions 70a, 70b to lock the roller wheel 62 in place, and a cotter pin 74 is threaded through the end of the locking bolt to prevent accidental withdrawal.

To install the annular patch on the vehicle, the cotter pin is removed and the locking bolt 72 is withdrawn outwardly using the T-handle 76 that is mounted on its outer end. This removes the locking bolt from the inner tubular sleeve 70b, thereby freeing the plate member 66a to pivot around hinge 68. The wheel assembly is then pivoted inwardly, in the direction indicated by arrow 78, to the retracted position which is shown in FIG. 6B. The annular patch can then be slipped over the end of the cylindrical support structure 12 without having to clear the roller wheel and caster pivot, in substantially the same manner as was described above with reference to FIG. 4A.

It is to be recognized that various alterations, modifications, and/or additions may be introduced into the constructions and arrangements of parts described above without departing from the spirit or ambit of the present invention.

What is claimed is:

1. A vehicle for transporting and installing an annular pipeline patch, said vehicle comprising:

a support member having forward and rearward ends;

an annular bladder mounted on said support member for forcing said patch against an inside surface of a pipeline in response to inflation of said bladder; and pivoting wheel assemblies mounted on said forward and rearward ends of said support member so as to extend substantially normal to a curved inside surface of said pipeline against which said wheel assemblies bear, so that said pivoting wheel assemblies support said vehicle and a patch carried therein in a vertical orientation as said vehicle moves through an interior of said pipeline.

2. The vehicle of claim 1, wherein said support member comprises:

a cylindrical support structure having first and second ends.

3. The vehicle of claim 2, wherein said cylindrical support structure comprises:

a length of cylindrical pipe having an external diameter sized to support said annular bladder and patch closely within said interior of said pipeline.

4. The vehicle of claim 2, wherein said pivoting wheel assemblies each comprise:

a caster pivot mounted to said cylindrical support member so as to extend substantially radially therefrom; and a roller wheel mounted to said radially extending caster pivot so that said roller wheel is aligned substantially normal to said curved inside surface of said pipeline when bearing thereon.

5. The vehicle of claim 4, wherein first and second said pivoting wheel assemblies are mounted at angularly spaced positions on said forward and rearward ends of said cylindrical support structure.

6. The vehicle of claim 5, further comprising:

a ballast member mounted to said cylindrical support structure between said angularly spaced wheel assemblies so as to maintain said vehicle in an upright orientation as said vehicle moves longitudinally through said pipeline.

7. The vehicle of claim 5, wherein said wheel assemblies further comprise:

means for detachably mounting said wheel assemblies to said cylindrical support member, so that said wheel assemblies are selectively removeable so as to provide clearance for sliding said annular patch over said cylindrical support and said bladder thereon.

8. The vehicle of claim 7, wherein said means for detachably mounting said wheel assemblies to said cylindrical support member comprises:

a clamp portion of each said wheel assembly for selectively engaging a projecting edge of said cylindrical support member.

9. The vehicle of claim 5, wherein said wheel assemblies further comprise:
   means for selectively pivoting said caster pivot and said roller wheel inwardly towards an interior of said cylindrical support member, so as to provide clearance for sliding said annular patch over said cylindrical support and said bladder thereon.

10. A vehicle for transporting and installing an annular patch in a pipeline having a cylindrically curved inside surface, said vehicle comprising:
    a tubular support member having a substantially cylindrical exterior and a hollow interior;
    an annular bladder mounted on said cylindrical exterior of said tubular support member for forcing said patch against said inside surface of a pipeline in response to inflation of said bladder;
    at least first and second pivoting wheel assemblies mounted at each end of said tubular support member, said wheel assemblies at each end of said tubular support member being mounted at angularly spaced locations so as to define an included angle between said wheel assemblies, each said wheel assembly comprising:
       a caster pivot mounted to said tubular support member so as to define a pivot axis that extends substantially radially from said tubular support member; and
       a roller wheel mounted to said caster pivot so as to pivot about said radially extending axis, so that said roller wheel is aligned substantially normal to said cylindrically curved inside surface of said pipeline when bearing thereon; and
    at least one ballast weight mounted inside said tubular support member within said included angle between said wheel assemblies, so as to maintain said vehicle in an upright orientation as said vehicle moves longitudinally through said pipeline.

11. The vehicle of claim 10, wherein said ballast weight comprises:
    at least one bar weight mounted lengthwise inside a bottom of said tubular support member.

12. The vehicle of claim 10, wherein said tubular support member comprises a length of cylindrical pipe.

13. The vehicle of claim 12, wherein said wheel assemblies further comprise:
    means for detachably mounting said wheel assemblies to said tubular support member, so that said wheel assemblies are selectively removeable so as to provide clearance for sliding said annular patch over said tubular support and said bladder thereon.

14. The vehicle of claim 13, wherein said means for detachably mounting said wheel assemblies to said tubular support member comprises:
    a clamp portion on each wheel assembly for selectively engaging an edge of said length of cylindrical pipe.

15. The vehicle of claim 14, wherein said clamp portion on each wheel assembly comprises:
    upper and lower jaw member for receiving an edge of said length of pipe therein, said lower jaw member comprising:
       a curved upper surface for matching said cylindrical exterior of said pipe so as to from a stable interfit therewith; and
       a flat lower surface to which said caster pivot is mounted so that said pivot axis extends perpendicularly thereto, said lower surface of said jaw member extending tangentially to said cylindrical outer surface of said pipe so as to align said pivot axis in a radial direction relative to said pipe.

16. The vehicle of claim 12, wherein said wheel assemblies further comprise:
    means for selectively pivoting said caster pivot and said roller wheel inwardly towards an interior of said tubular support member, so as to provide clearance for sliding said annular patch over said tubular support member and said inflatable bladder therefrom.

17. The vehicle of claim 16, wherein said means for selectively pivoting said caster pivot and said roller wheel inwardly comprises:
    a first bracket member mounted to an inside lip of said pipe;
    a second bracket member having said caster pivot and said roller wheel mounted thereto; and
    a hinge interconnecting said first and second bracket members so that said second bracket member is pivotable from a deployed position, in which said second bracket extends outwardly from said pipe so that said roller wheel bears against said inside surface of said pipeline, to a retracted position, in which said second bracket member extends towards said interior of said length of pipe so that said roller wheel is withdrawn within an outside diameter of said pipe.

18. The vehicle of claim 17, wherein said means for selectively pivoting said caster pivot and said roller wheel inwardly comprises:
    means for locking and unlocking said second bracket member in said deployed position, so that said second bracket member can be selectively unlocked and pivoted to said retracted position.

19. The vehicle of claim 18, wherein said means for locking and unlocking said second bracket member in said deployed position comprises:
    a first sleeve portion mounted on said first bracket member;
    a second sleeve portion mounted on said second bracket member so as to be in axial alignment with said first sleeve portion when said second bracket member is in said deployed position; and
    a locking bolt for passing through said sleeve portions when coaxially aligned so as to lock said second bracket member in said deployed position, said locking bolt being selectively withdrawable from said sleeve portions so as to unlock said second bracket member to be pivoted to said retracted position.

20. A vehicle for transporting and installing an annular patch in a pipeline having a cylindrically curved inside surface, said vehicle comprising:
    a short length of pipe forming tubular support member having a substantially cylindrical exterior and a hollow interior;
    an annular bladder mounted on said cylindrical exterior of said tubular support member for forcing said patch against said inside surface of a pipeline in response to inflation of said bladder;
    a compressed air fitting for supplying compressed air to said annular bladder, said fitting being mounted inside said support member for attachment to a compressed air line extending through said pipeline and into said hollow interior of said tubular support member;
    at least first and second pivoting wheel assemblies mounted at each end of said tubular support member, said wheel assemblies at each end of said tubular support member being mounted at angularly spaced locations so as to define an included angle between said assemblies, each said wheel assembly comprising:
- a caster pivot mounted to said tubular support member so as to define a pivot axis that extends substantially radially from said tubular support member;
- a roller wheel mounted to said caster pivot so as to pivot about said radially extending axis, so that said roller wheel is aligned substantially normal to said curved inside surface of said pipeline when bearing thereon, and
- means for selectively pivoting said caster pivot and said roller wheel inwardly towards said interior of said tubular support member so as to provide clearance for sliding said annular patch over said tubular support member and said inflatable bladder thereon, said means for selectively pivoting said caster pivot and said roller wheel inwardly comprising:
  - a first bracket member mounted to an inside lip of said pipe and having a sleeve portion mounted thereon;
  - a second bracket member having said caster pivot and said roller wheel mounted thereto, and a second sleeve portion mounted thereon so as to be in coaxial alignment with said first sleeve portion when said second bracket member is in a deployed position;
  - a hinge interconnecting said first and second bracket members so that said second bracket member is pivotable from said deployed position, in which said second bracket extends outwardly from said pipe so that said roller wheel bears against said inside surface of said pipeline, to a retracted position, in which said second bracket member extends towards said interior of said length of pipe so that said roller wheel is withdrawn within an outside diameter of said pipe;
  - a locking bolt for passing through said sleeve portions when coaxially aligned so as to lock said second bracket member in said deployed position, said locking bolt being selectively withdrawable from said sleeve portions so as to unlock said second bracket member to be pivoted to said retracted position; and
- at least one ballast bar mounted lengthwise inside a bottom of said tubular support member within said included angle between said wheel assemblies, so as to maintain said vehicle in an upright orientation as said vehicle moves longitudinally through said pipeline.

21. A vehicle for transporting and installing an annular patch in a pipeline having a cylindrically curved inside surface, said vehicle comprising:
- a tubular support member having a substantially cylindrical exterior and a hollow interior, said tubular support member comprising:
- a length of cylindrical pipe;
- an annular bladder mounted on said cylindrical exterior of said tubular support member for forcing said patch against said inside surface of a pipeline in response to inflation of said bladder;
- at least first and second pivoting wheel assemblies mounted at each end of said tubular support member, said wheel assemblies at each end of said tubular support member being mounted at angularly spaced locations so as to define an included angle between said wheel assemblies, each said wheel assembly comprising:
  - a caster pivot mounted to said tubular support member so as to define a pivot axis that extends substantially radially from said tubular support member;
  - a roller wheel mounted to said caster pivot so as to pivot about said radially extending axis, so that said roller wheel is aligned substantially normal to said cylindrically curved inside surface of said pipeline when bearing thereon; and
- at least one ballast weight mounted inside said tubular support member within said included angle between said wheel assemblies, so as to maintain said vehicle in an upright orientation as said vehicle moves longitudinally through said pipeline, said ballast weight comprising:
  - at least one bar weight mounted lengthwise inside a bottom of said tubular support member; and
- means for detachably mounting said wheel assemblies to said tubular support member, so that said wheel assemblies are selectively removeable so as to provide clearance for sliding said annular patch over said tubular support and said bladder thereon, said means for detachably mounting said wheel assemblies to said tubular support member comprising:
  - a clamp portion on each wheel assembly for selectively engaging an edge of said length of cylindrical pipe, each said clamp portion having upper and lower jaw members for receiving an edge of said length of pipe therein, said lower jaw member comprising:
    - a curved upper surface for matching said cylindrical exterior of said pipe so as to form a stable interfit therewith; and
    - a flat lower surface to which said caster pivot is mounted so that said pivot axis extends perpendicularly thereto, said lower surface of said jaw member extending tangentially to said cylindrical outer surface of said pipe so as to align said pivot axis in a radial direction relative to said pipe.

22. A vehicle for transporting and installing an annular patch in a pipeline having a cylindrically curved inside surface, said vehicle comprising:
- a tubular support member having a substantially cylindrical exterior and a hollow interior, said tubular support member comprising a length of cylindrical pipe;
- an annular bladder mounted on said cylindrical exterior of said tubular support member for forcing said patch against said inside surface of a pipeline in response to inflation of said bladder;
- at least first and second pivoting wheel assemblies mounted at each end of said tubular support member, said wheel assemblies at each end of said tubular support member being mounted at angularly spaced locations so as to define an included angle between said wheel assemblies, each said wheel assembly comprising:
  - a caster pivot mounted to said tubular support member so as to define a pivot axis that extends substantially radially from said tubular support member;
  - a roller wheel mounted to said caster pivot so as to pivot about said radially extending axis, so that said roller wheel is aligned substantially normal to said cylindrically curved inside surface of said pipeline when bearing thereon; and
- means for selectively pivoting said caster pivot and said roller wheel inwardly towards an interior of said tubular support member, so as to provide clearance for sliding said annular patch over said tubular support member and said inflatable bladder therefrom, said means for selectively pivoting said caster pivot and said roller wheel inwardly comprising:
- a first bracket member mounted to an inside lip of said pipe;
- a second bracket member having said caster pivot and said roller wheel mounted thereto;
- a hinge interconnecting said first and second bracket members so that said second bracket member is pivotable from a deployed position in which said second bracket extends outwardly from said pipe so that said roller wheel bears against said inside surface of said pipeline, to a retracted position in which said second bracket member extends towards said interior of said length of pipe so that said roller wheel is withdrawn within an outside diameter of said pipe; and at least one ballast weight mounted inside said tubular support member within said included angle between said wheel assemblies, so as to maintain said vehicle in an upright orientation as said vehicle moves longitudinally through said pipeline, said ballast weight comprising:
- at least one bar weight mounted lengthwise inside a bottom of said tubular support member.

23. The vehicle of claim 22, wherein said means for selectively pivoting said caster pivot and said roller wheel inwardly comprises:

means for locking and unlocking said second bracket member in said deployed position, so that said second bracket member can be selectively unlocked and pivoted to said retracted position.

24. The vehicle of claim 23, wherein said means for locking and unlocking said second bracket member in said deployed position comprises:

- a first sleeve portion mounted on said first bracket member;
- a second sleeve portion mounted on said second bracket member so as to be in axial alignment with said first sleeve portion when said second bracket member is in said deployed position; and
- a locking bolt for passing through said sleeve portions when coaxially aligned so as to lock said second bracket member in said deployed position, said locking bolt being selectively withdrawable from said sleeve portions so as to unlock said second bracket member to be pivoted to said retracted position.

* * * * *